(No Model.)
W. P. H. CAMPBELL.
WINDMILL REGULATOR.
No. 602,153. Patented Apr. 12, 1898.
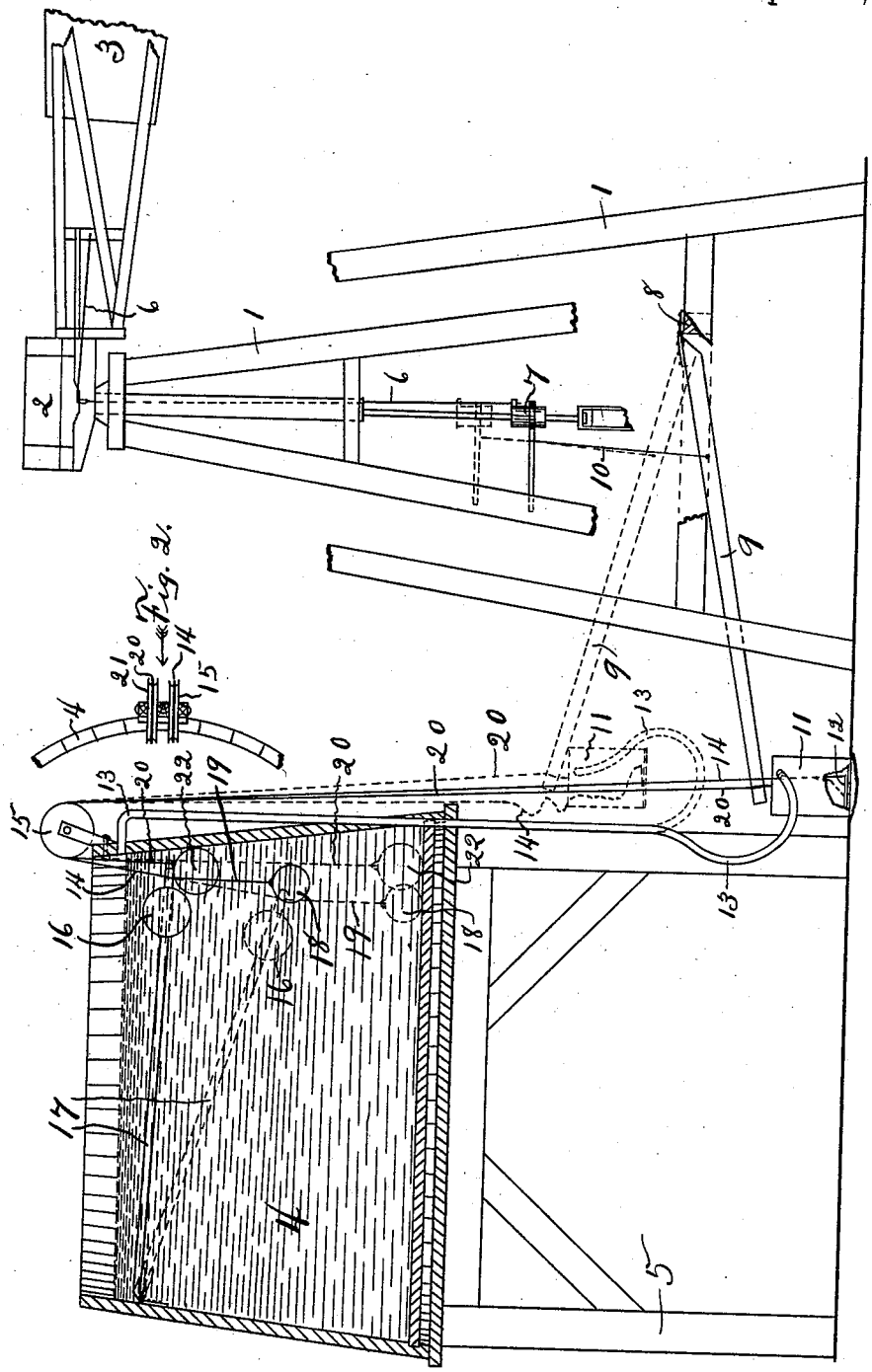
Witnesses
Molbry Haynes
L. B. Hodge
Inventor
Westley P. H. Campbell
By Joshua B. Webster
Attorney
THE NORRIS PETERS CO., PHOTO-LITHO., WASHINGTON, D. C.

UNITED STATES PATENT OFFICE.

WESTLEY P. H. CAMPBELL, OF STOCKTON, CALIFORNIA.

WINDMILL-REGULATOR.

SPECIFICATION forming part of Letters Patent No. 602,153, dated April 12, 1898.

Application filed August 21, 1897. Serial No. 649,078. (No model.)

*To all whom it may concern:*

Be it known that I, WESTLEY P. H. CAMPBELL, a citizen of the United States, residing at Stockton, in the county of San Joaquin and State of California, have invented certain new and useful Improvements in Windmill-Regulators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to certain improvements in windmill-regulators, such as will effectually and automatically turn the windmill out of the wind as the water-tank becomes filled and turn such wind-wheel to the wind when sufficient water is drawn from the tank; and it consists in the peculiar construction and novel combination and adaptation of parts hereinafter described, and particularly pointed out in the claim hereunto annexed, reference being had to the accompanying drawings, in which—

Figure 1 is a side elevation of a windmill tower and tank having my improved windmill-regulator attached thereto, such tank being in section. Fig. 2 is a detached top view of the pulleys mounted on the side of the tank.

Similar figures of reference indicate corresponding parts throughout both views.

1 represents the tower of a windmill, and 2 represents the turn-table, and 3 the tail of the same.

4 represents a water-tank of ordinary construction mounted on a frame 5.

6 is a cord or wire such as is commonly used for the purpose of regulating the tail 3, which in turn controls the wind-wheel, (not shown,) thus starting and stopping by the aid of the wind the pump. Such cord 6 is attached at its upper end to the tail 3 in the usual manner and at its lower end to a swivel 7, which is old and therefore needs no specific description.

The tower 1 is provided near its foot with a horizontal cross-piece 8, which is rigidly attached thereto. Such cross-piece 8 is provided with a lever 9, which is flexibly attached thereto. A cord or wire 10 is attached at one end to the swivel 7 and at its other end to the lever 9 at a suitable distance from the inner end of such lever 9.

From the outer end of the lever 9 a vessel 11, of suitable dimensions, suitable for holding water and having a water-tight valve 12 in the bottom of the same, is flexibly suspended, such vessel being also provided with an opening in the side, near the top, in which a flexible pipe 13 is rigidly attached at its lower end, and its upper end is rigidly inserted in the side of the tank 4, near the top of the same, at the highest point that it is desired for the water to reach in such tank 4, as the pipe 13 is adapted to serve as a waste-pipe as well as to conduct the water into the vessel 11 when the tank 4 is full and it is desired to turn the wind-wheel out of the wind.

A cord 14 is attached to the valve 12 and extends upward over a pulley 15, which is suitably mounted on one side of the tank 4, near the top of the same. Such cord 14 then extends downwardly into the tank 4 and is attached to a float 16, having one end of a horizontal arm 17 rigidly attached thereto, such arm 17 being flexibly attached to the opposite side of the tank 4, so as to allow the vertical and prevent the lateral motion of the float 16. To the loose end of the arm 17 a weight 18 is suspended by means of a cord 19 of suitable length for the purpose, as will be shown.

To the outer end of the lever 9 a cord 20 is attached, and extends upwardly over a pulley 21, which is mounted on the side of the tank 4, near the top of the same, and then extends downwardly into the tank 4 and is attached to a weight 22, which is adapted to raise the vessel 11 and lever 9, when such vessel 11 is empty, to the position shown by the dotted lines, whereupon the wind-wheel may turn toward the wind.

The mode of operating my improved windmill-regulator is as follows: When the tank is full, the weight 18, acting against the buoyancy of the float 16 and the weight of the water on the valve 12 in vessel 11, will hold the said float below the surface of the water, as shown in Fig. 1. When, however, water is drawn from the tank both float 16 and weight 18 will move downwardly, and in consequence the valve 12 will be opened through the medium of cord 14 and the water permitted to escape from the vessel. This being done, the weight 22, by means of the cord 20 and pulley 21, raises the vessel 11 and lever 9, as shown by the dotted lines, Fig. 1, which will allow the wind-wheel to turn to the wind. When the tank 4 is filled, the surplus water runs into the pipe 13 and fills the vessel 11, the valve 12 being closed by reason of its own weight, and as the vessel 11 is partly filled the weight of the water begins to press the vessel 11 and lever 9 downward by reason of the tail being easier to manipulate at first, and when the vessel 11 is about half-way to the ground the cord 14 becomes taut and, by means of the buoyancy of the float 16 and the pressure of the water on the valve 12, raises the weight 18 as the vessel 11 is depressed, which depression of the vessel 11 turns the wind-wheel out of the wind by means of the connecting mechanism.

The cord 14 is of sufficient length to allow the float 16 to remain a short distance under the water in the tank 4 when such tank is filled and when the vessel 11 is depressed, and the cord 19 is of sufficient length to allow a slack in the cord 14 when the vessel 11 is raised, thereby preventing a tension on the valve 12 until enough water has run into the vessel 11 to enable said vessel, in conjunction with the buoyancy of the float 16, to counterbalance the weight 18 while the float 16 is under water.

I have dispensed in both the description and drawings with many features of my machine which are old, and have shown only such old parts as are necessary to illustrate my invention.

Having thus described my invention, what I claim as new, and desire to secure by Letters Patent, is—

In a windmill-regulator, the combination of the tank, the vessel arranged to hang suspended from mechanism for throwing the wheel of the mill into and out of the wind and having the upwardly-opening valve 12 in its bottom, the flexible pipe connecting the tank and the vessel, the weight 22, a cord taking over a sheave on the tank and connecting the weight 22 with the vessel, the float arranged in the tank, a cord taking over a sheave on the tank and connecting said float with the valve 12 of the vessel, and the weight 18 suspended from the said float, substantially as and for the purpose set forth.

In testimony whereof I affix my signature in presence of two witnesses.

WESTLEY P. H. CAMPBELL.

Witnesses:
MOLBRY HAYNES,
L. B. HODGE.